United States Patent
Tanaka et al.

(10) Patent No.: US 10,786,871 B2
(45) Date of Patent: Sep. 29, 2020

(54) WEAR-RESISTANT MEMBER AND WEAR-RESISTANT MEMBER PRODUCTION METHOD

(71) Applicant: TOYOTA JIDOSHA KABUSHIKI KAISHA, Toyota-shi, Aichi-ken (JP)

(72) Inventors: Keizo Tanaka, Miyoshi (JP); Yasuhiro Yamamoto, Chiryu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 78 days.

(21) Appl. No.: 15/884,501

(22) Filed: Jan. 31, 2018

(65) Prior Publication Data

US 2018/0214993 A1    Aug. 2, 2018

(30) Foreign Application Priority Data

Feb. 2, 2017  (JP) .................................. 2017-017454

(51) Int. Cl.

| | |
|---|---|
| *B32B 15/01* | (2006.01) |
| *B23K 26/34* | (2014.01) |
| *C22C 9/06* | (2006.01) |
| *B23K 26/14* | (2014.01) |
| *B23K 26/342* | (2014.01) |
| *B23K 26/10* | (2006.01) |
| *B23K 26/144* | (2014.01) |

(Continued)

(52) U.S. Cl.
CPC .......... *B23K 26/342* (2015.10); *B23K 26/106* (2013.01); *B23K 26/144* (2015.10); *B23K 26/1476* (2013.01); *B23K 26/34* (2013.01); *B32B 15/017* (2013.01); *C22C 9/06* (2013.01); *C22C 27/04* (2013.01); *B23K 2101/006* (2018.08); *B23K 2101/34* (2018.08); *B23K 2103/10* (2018.08); *B23K 2103/12* (2018.08); *B23K 2103/16* (2018.08); *B23K 2103/50* (2018.08)

(58) Field of Classification Search
None
See application file for complete search history.

(56) References Cited

U.S. PATENT DOCUMENTS

2004/0045641 A1* 3/2004 Kawasaki ............. C22C 1/0425
148/435

FOREIGN PATENT DOCUMENTS

| JP | 10-176511 A | 6/1998 |
|---|---|---|
| JP | 2001-105177 A | 4/2001 |

(Continued)

*Primary Examiner* — Xiaobei Wang
(74) *Attorney, Agent, or Firm* — Sughrue Mion, PLLC

(57) ABSTRACT

A wear-resistant member production method includes: forming a clad layer by moving, relative to a substrate while feeding cladding powder onto the substrate and melting it using a local heating device; and cutting the clad layer. The cladding powder includes matrix powder containing a copper-based alloy, and hard powder including, as a hard phase, a silicide containing one or more elements selected from Cr, Fe, Co, Ni, and Cu, and one or more elements selected from Mo, W, and Nb. The hard powder includes first hard powder and second hard powder. The second hard powder is fed, separately from the first hard powder, to a melt pool formed by melting the first hard powder and the matrix powder, such that at least part of the second hard powder remains unmelted within the clad layer.

9 Claims, 6 Drawing Sheets

(51) Int. Cl.
*C22C 27/04* (2006.01)
*B23K 35/30* (2006.01)
*B23K 103/12* (2006.01)
*B23K 103/00* (2006.01)
*B23K 101/00* (2006.01)
*B23K 103/16* (2006.01)
*B23K 103/10* (2006.01)
*B23K 101/34* (2006.01)

(56) References Cited

FOREIGN PATENT DOCUMENTS

| | | |
|---|---|---|
| JP | 4114922 B2 | 4/2008 |
| JP | 2008-279463 A | 11/2008 |
| WO | 02/055748 A1 | 7/2002 |

* cited by examiner

WEAR-RESISTANT MEMBER AND WEAR-RESISTANT MEMBER PRODUCTION METHOD

INCORPORATION BY REFERENCE

The disclosure of Japanese Patent Application No. 2017-017454 filed on Feb. 2, 2017 including the specification, drawings and abstract is incorporated herein by reference in its entirety.

BACKGROUND

1. Technical Field

The disclosure relates generally to a wear-resistant member and a wear-resistant member production method, and relates more specifically to a wear-resistant member including a substrate and a clad layer provided on the substrate and a method of producing the same.

2. Description of Related Art

There are wear-resistant members including a clad layer provided on a substrate thereof, thus exhibiting improved wear resistance. Examples of such wear-resistant members include a valve seat having wear resistance. A valve seat resistant to wear is provided on a circumferential edge of a combustion chamber-side opening end of each of intake ports and exhaust ports provided in a cylinder head, because a valve repeatedly comes into contact with the circumferential edge under a high-temperature environment.

The valve seat is produced by forming a clad layer on the circumferential edge of the opening end of each of the intake ports and exhaust ports of an unfinished cylinder head, which is a substrate, and then cutting the clad layer. The clad layer is progressively formed by moving a melt pool formed on the substrate by a local heating device while feeding metal powder to the melt pool. Concrete examples of a heat source used in the local heating device include a laser beam, an acetylene gas flame, and a plasma arc.

Japanese Unexamined Patent Application Publication No. 2001-105177 (JP 2001-105177 A) describes a technique of forming a clad layer by melting cladding powder (i.e., powder used in cladding) that includes hard powder and matrix powder. The hard powder contains at least one of molybdenum (Mo) and tungsten (W). The matrix powder contains a copper-based alloy.

SUMMARY

The inventors found the following issues to be addressed, regarding the wear-resistant member production method. According to this method, a clad layer is formed by melting cladding powder, which includes hard powder and matrix powder, by a local heating device while the cladding powder is fed onto a substrate, and then the clad layer is cut. With the technique described in JP 2001-105177 A, hard powder particles melted by the local heating device may aggregate, and hard particles in the clad layer may thus become so coarse that the machinability of the clad layer deteriorates.

The disclosure provides a technique of suppressing hard particles in a clad layer from becoming coarse, thereby improving the machinability of the clad layer.

A first aspect of the disclosure relates to a wear-resistant member production method including: forming a clad layer on a substrate; and cutting the clad layer formed on the substrate. The clad layer is formed by moving, relative to the substrate, a site to be heated by a local heating device, while feeding cladding powder onto the substrate and melting the cladding powder using the local heating device. The cladding powder includes matrix powder and hard powder. The matrix powder contains a copper-based alloy. The hard powder includes a silicide as a hard phase. The silicide contains one or more elements selected from Cr, Fe, Co, Ni, and Cu, and one or more elements selected from Mo, W, and Nb. The hard powder includes first hard powder and second hard powder. In the course of formation of the clad layer, the second hard powder is fed, separately from the first hard powder, to a melt pool formed by melting the first hard powder and the matrix powder using the local heating device, such that at least part of the second hard powder remains unmelted within the clad layer.

In the wear-resistant member production method according to the first aspect of the disclosure, the hard powder is divided into the first hard powder and the second hard powder, and the first hard powder and the matrix powder are melted by the local heating device. That is, this method can reduce the amount of the hard powder to be melted by the local heating device, as compared to conventional methods. It is thus possible to suppress the hard particles in the clad layer from becoming coarse due to aggregation of the hard powder particles. As a result, deterioration of the machinability of the clad layer is reduced. In addition, sufficient wear resistance is ensured by allowing at least part of the second hard powder to remain unmelted within the clad layer.

The second hard powder may have a larger particle size than the particle size of the first hard powder. The larger the particle size of the second hard powder is, the higher the wear resistance is. The smaller the particle size of the first hard powder is, the more easily the first hard powder is melted by the local heating device. The particle size of the second hard powder may be 250 µm or less to improve the machinability.

The second hard powder may be fed to the melt pool from a position rearward of a position from which the first hard powder is fed, in a direction in which the site to be heated is moved relative to the substrate. Each of both the first hard powder and the second hard powder contains at least 10 mass % of the one or more elements selected from Cr, Fe, Co, Ni, and Cu, at least 15 mass % of the one or more elements selected from Mo, W, and Nb, and 2.0 mass % to 8.0 mass % of Si.

A second aspect of the disclosure relates to a wear-resistant member including: a substrate; and a clad layer provided on the substrate. The clad layer includes a matrix, hard powder, and crystallized particles that crystallize out in the matrix. The matrix contains a copper-based alloy. The hard powder remains unmelted and includes, as a hard phase, a silicide containing one or more elements selected from Cr, Fe, Co, Ni, and Cu, and one or more elements selected from Mo, W, and Nb. The crystallized particles include, as a hard phase, a silicide containing one or more elements selected from Cr, Fe, Co, Ni, and Cu, and one or more elements selected from Mo, W, and Nb.

The wear-resistant member according to the second aspect of the disclosure includes hard powder and crystallized particles. The hard powder remains unmelted and includes, as the hard phase, the silicide containing one or more elements selected from Cr, Fe, Co, Ni, and Cu, and one or more elements selected from Mo, W, and Nb. The crystallized particles include, as the hard phase, the silicide containing one or more elements selected from Cr, Fe, Co, Ni, and Cu, and one or more elements selected from Mo, W, and Nb. At least part of the hard powder remains unmelted within the clad layer, so that it is possible to ensure sufficient wear resistance. In addition, it is possible to suppress the crystallized particles in the clad layer from becoming coarse due to aggregation of the hard powder particles. As a result, deterioration of the machinability of the clad layer is reduced.

The hard powder may have a larger particle size than the particle size of the crystallized particles. The larger the particle size of the hard powder is, the higher the wear resistance is. To improve the machinability, the particle size of the hard powder may be 250 µm or less, and the particle size of the crystallized particles may be 100 µm or less. In addition, the crystallized particles may have a higher hardness than the hardness of the hard powder.

The disclosure suppresses the hard particles in the clad layer from becoming coarse, thereby improving the machinability of the clad layer.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, example embodiments of the disclosure will be described in detail with reference to the accompanying drawings. Note that the disclosure is not limited to the following embodiments. The following description and the drawings are simplified as appropriate to facilitate the understanding of the description.

First Embodiment

First, a wear-resistant member production method according to a first embodiment will be described with reference to FIG. 1 to FIG. 5. A valve seat formed on a cylinder head of an engine will be described, as an example of a wear-resistant member. However, a wear-resistant member is not limited to a valve seat.

Figure 1:
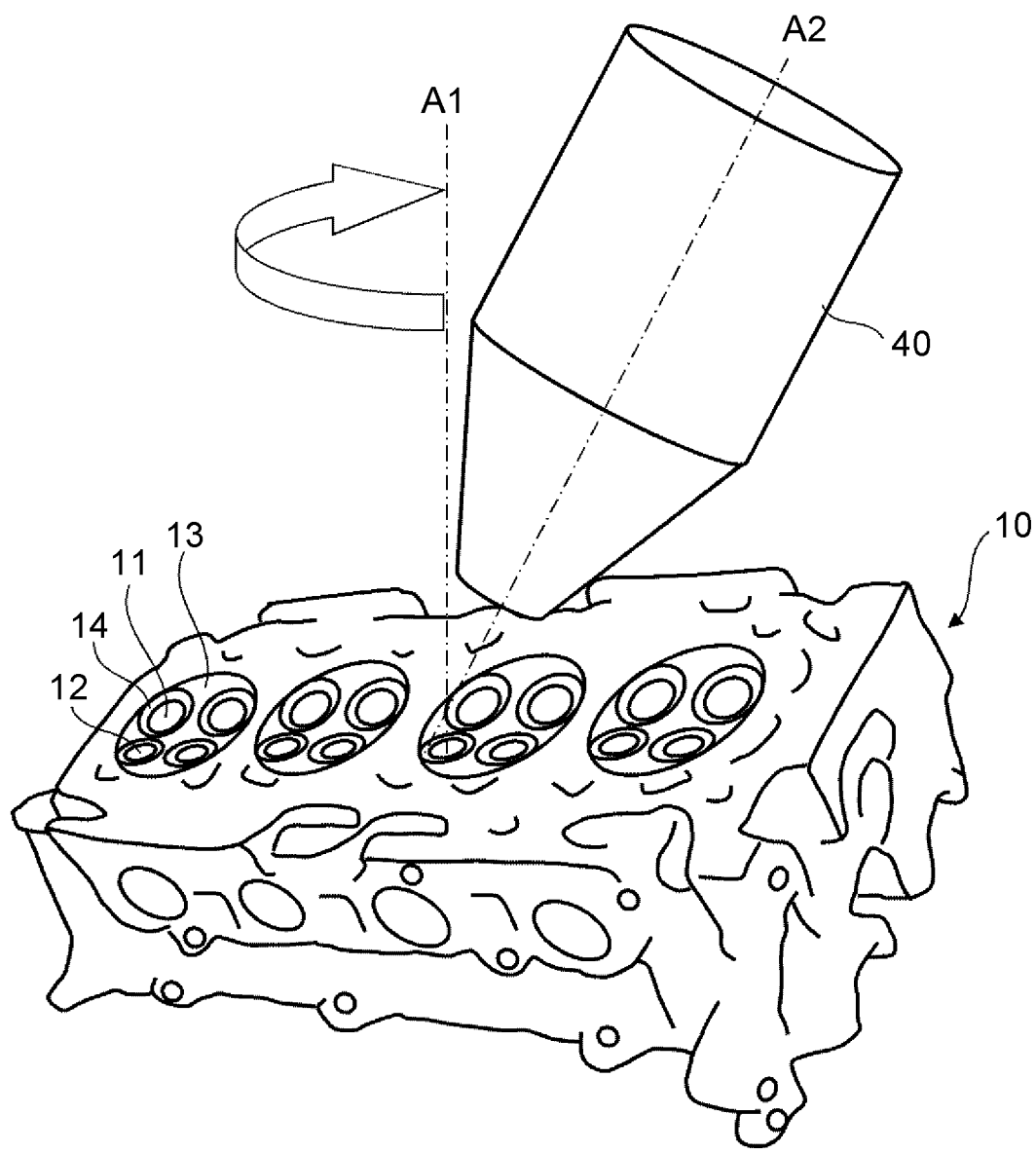
FIG. 1 is a perspective view schematically illustrating the outline of a step of forming a clad layer in a wear-resistant member production method according to a first embodiment.
Figure 2:
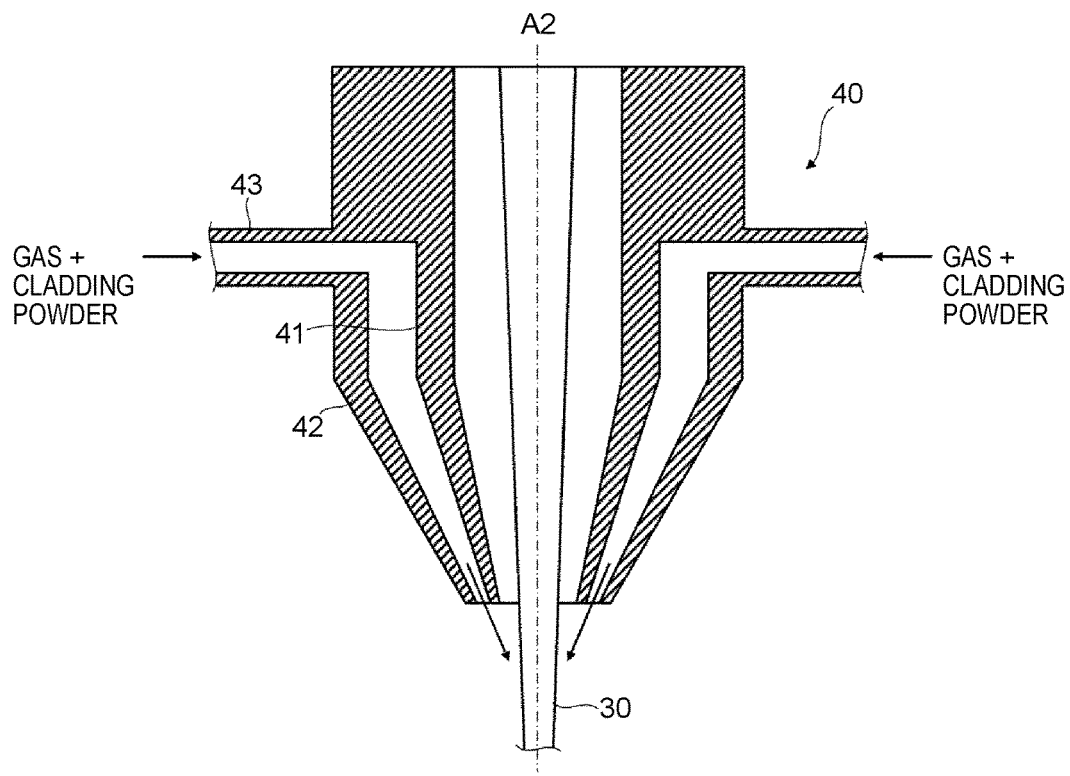
FIG. 2 is a sectional view of a laser processing head used in the wear-resistant member production method according to the first embodiment.
Figure 3:
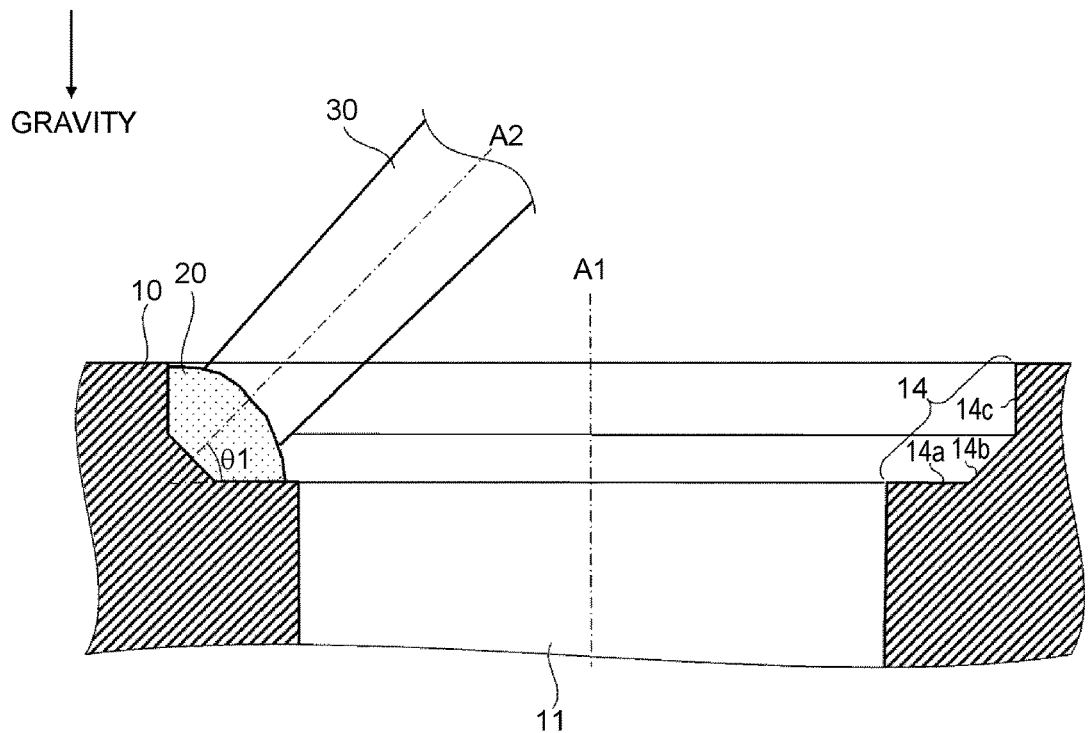
FIG. 3 is a sectional view illustrating the details of the wear-resistant member production method according to the first embodiment.
Figure 4:
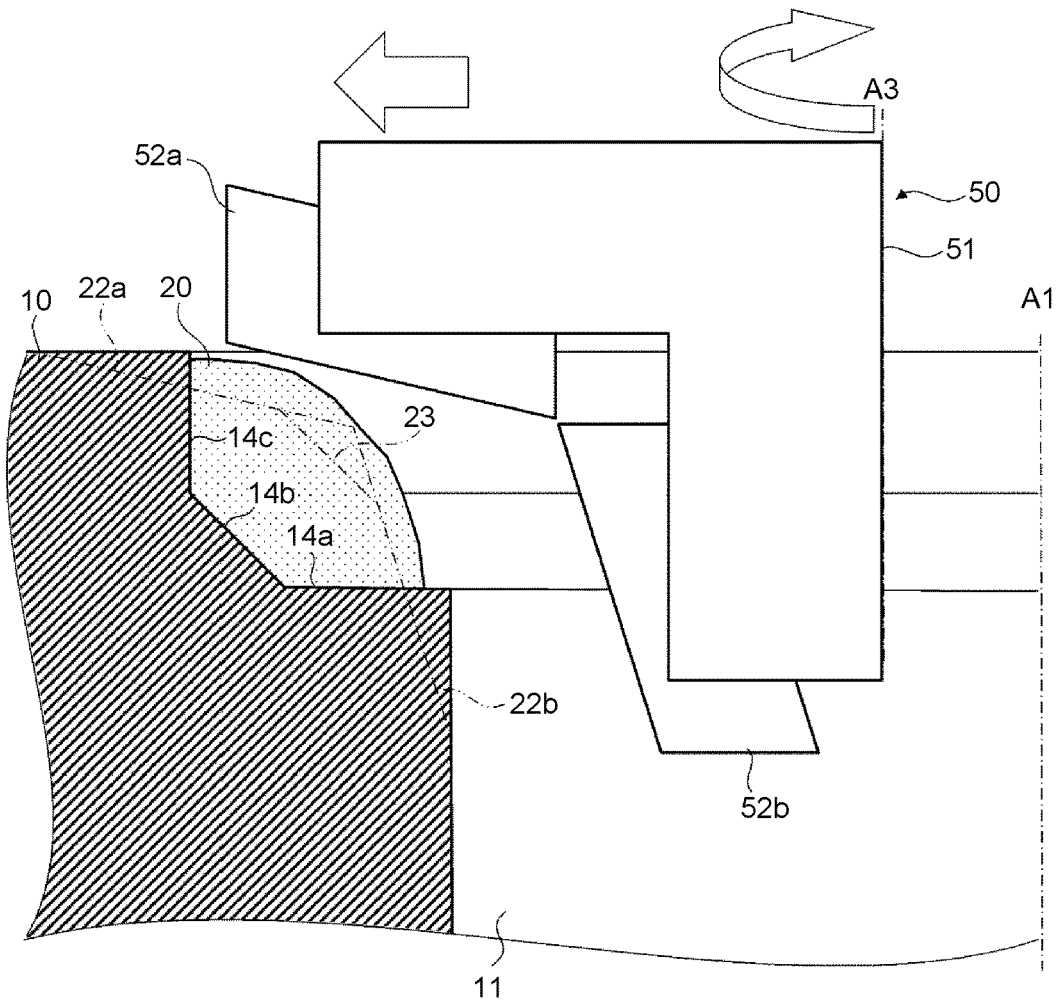
FIG. 4 is a sectional view illustrating the details of the wear-resistant member production method according to the first embodiment.
Figure 5:
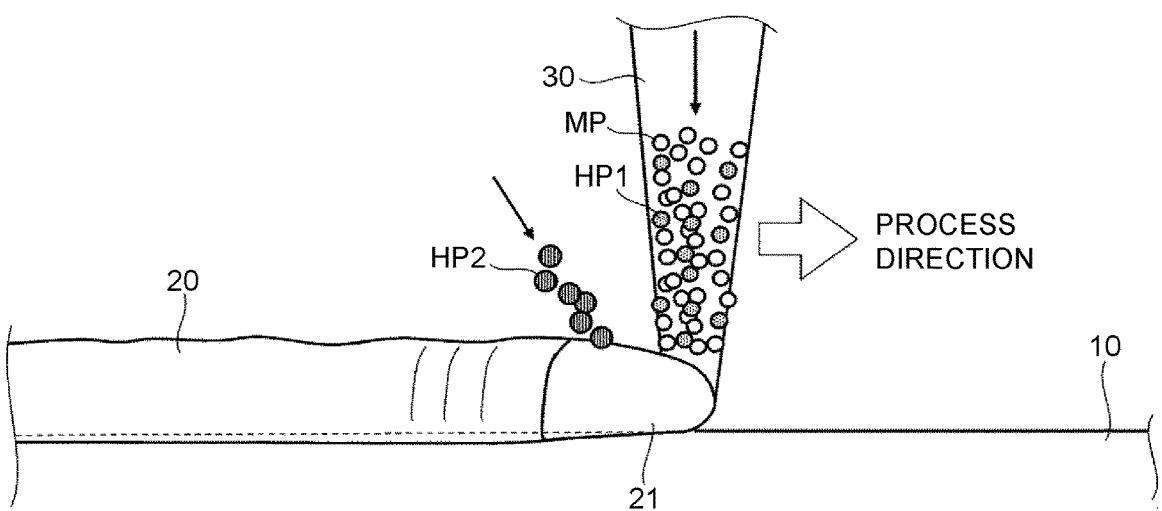
FIG. 5 is a side view schematically illustrating a method of feeding cladding powder in the step of forming a clad layer.

FIG. 1 is a perspective view schematically illustrating the outline of a step of forming a clad layer in the wear-resistant member production method according to the first embodiment. FIG. 2 is a sectional view of a laser processing head used in the wear-resistant member production method according to the first embodiment. FIG. 3 and FIG. 4 are each a sectional view illustrating the details of the wear-resistant member production method according to the first embodiment. FIG. 5 is a side view schematically illustrating a method of feeding cladding powder in the step of forming a clad layer.

With reference to FIG. 1, description will be provided on the outline of the step of forming a clad layer in the wear-resistant member production method according to the first embodiment. First, the configuration of an unfinished cylinder head 10, which is an example of a substrate, will be described. The unfinished cylinder head 10 is a casting containing, for example, cast iron or an aluminum alloy. As illustrated in FIG. 1, the unfinished cylinder head 10 includes a plurality of combustion chambers 13. Each combustion chamber 13 is provided with intake ports 11 and exhaust ports 12. A counterbored groove 14 is formed, by machining, on a circumferential edge of an opening end of each of the intake ports 11 and exhaust ports 12. A clad layer is to be formed in the counterbored groove 14. Note that the above-described opening end is an opening end on the combustion chamber 13-side.

The unfinished cylinder head 10 illustrated in FIG. 1 is to be formed into a cylinder head for an engine including four cylinders and provided with 16 valves. The unfinished cylinder head 10 includes four combustion chambers 13 each provided with two intake ports 11 and two exhaust ports 12. Needless to say, the number of the combustion chambers 13, the number of the intake ports 11, and the number of the exhaust ports 12 are not limited to those illustrated in an example in FIG. 1, and may be set as appropriate.

As illustrated in FIG. 1, a clad layer is formed by applying a laser beam 30 (having an optical axis A2) to the counterbored groove 14 from a laser processing head 40 while feeding cladding powder (i.e., powder used in cladding) to the counterbored groove 14 from the laser processing head 40. When the laser processing head 40 makes one turn around a central axis A1 of the counterbored groove 14 having an annular shape, a clad layer is formed over the entire circumference of the counterbored groove 14. The central axis A1 passes through the center of the counterbored groove 14 and is perpendicular to the bottom surface of the counterbored groove 14. A clad layer is formed around each of the intake ports 11 and exhaust ports 12 after the posture of the unfinished cylinder head 10 is adjusted such that the extending direction of the central axis A1 of the counterbored groove 14 of each of the intake ports 11 and exhaust ports 12 coincides with the vertical direction. In the wear-resistant member production method according to the first embodiment, cladding powder is fed also from a nozzle other than the laser processing head 40, as will be described later in detail with reference to FIG. 5.

Next, the configuration of the laser processing head 40 will be described with reference to FIG. 2. The laser processing head 40 includes an inner nozzle 41, an outer nozzle 42, and a material feed pipe 43. That is, the laser processing head 40 has a coaxial double pipe structure composed of the inner nozzle 41 and the outer nozzle 42 each having a central axis that coincides with the optical axis A2 of the laser beam 30.

Specifically, the laser beam 30 is emitted from the inner nozzle 41. In addition, inert gas and cladding powder that have been fed through the material feed pipe 43 are discharged from a gap between the inner nozzle 41 and the outer nozzle 42. That is, the axis along which the cladding powder and the inert gas are discharged coincides with the optical axis A2 of the laser beam 30. Examples of the inert gas include argon gas and nitrogen gas.

As described above, a portion from which the laser beam 30 is emitted and a portion from which the cladding powder and the inert gas are fed are integral with each other. Thus, a laser processing device is made compact. The material feed pipe 43 is omitted from FIG. 1.

Next, the details of the wear-resistant member production method according to the first embodiment will be described with reference to FIG. 3 and FIG. 4. FIG. 3 illustrates a step of forming a clad layer 20. FIG. 4 illustrates a step of cutting the clad layer 20. The method of producing a valve seat, which is an example of a wear-resistant member, is the same regardless of whether the valve seat will be provided in the intake port 11 or will be provided in the exhaust port 12. Therefore, the method of producing a valve seat to be provided in the intake port 11 will be described below.

First, as illustrated in FIG. 3, the laser beam 30 is applied to the counterbored groove 14 having an annular shape and formed on the circumferential edge of the opening end of the intake port 11 while the cladding powder is fed to the counterbored groove 14. Note that, the above-described opening end of the intake port 11 is an opening end on the combustion chamber 13-side. Thus, the cladding powder is melted and then solidified in the counterbored groove 14, whereby a clad layer 20 to be processed into a valve seat is formed.

As illustrated in FIG. 1, the laser beam 30 (having the optical axis A2) is emitted from the laser processing head 40. The laser processing head 40 makes one turn around the central axis A1 of the counterbored groove 14 having an annular shape, and thus the clad layer 20 is formed over the entire circumference of the counterbored groove 14. A tilt angle θ1 of the optical axis A2 of the laser beam 30 is about 45°, as illustrated in FIG. 3.

The counterbored groove 14 is formed, for example, by machining. The counterbored groove 14 has a bottom surface 14a, a tilted surface 14b, and a side wall 14c, as illustrated in FIG. 3. The clad layer 20 is likely to have a defect at a corner of the counterbored groove 14. However, due to the tilted surface 14b provided between the bottom surface 14a and the side wall 14c, it is possible to reduce the occurrence of a defect in the clad layer 20 at the corner of the counterbored groove 14.

Next, as illustrated in FIG. 4, the clad layer 20, together with the unfinished cylinder head 10, is cut through contouring. A cutting tool 50 for contouring includes a holder 51 and cutting bits 52a, 52b fixed to the holder 51. The cutting bits 52a, 52b are, for example, carbide tips.

The cutting tool 50 moves from the inside toward the outside in the radial direction of the counterbored groove 14 while rotating about a rotational axis A3 at a high speed. Thus, the clad layer 20 and the unfinished cylinder head 10 are cut into a shape indicated by long dashed double-dotted lines. Specifically, a combustion-chamber-side guide surface 22a is formed by the cutting bit 52a, and a port-inner-side guide surface 22b is formed by the cutting bit 52b. Finally, a valve seat surface 23 is formed by further cutting the clad layer 20. The cutting method is not limited to contouring, and may be, for example, plunging.

Next, with reference to FIG. 5, description will be provided on a method of feeding the cladding powder in the step of forming a clad layer illustrated in FIG. 3. As illustrated in FIG. 5, the cladding powder includes matrix powder MP and hard powder. The matrix powder MP contains a copper-based alloy. The hard powder includes, as a hard phase, a silicide containing one or more elements selected from chromium (Cr), iron (Fe), cobalt (Co), nickel (Ni), and copper (Cu), and one or more elements selected from molybdenum (Mo), tungsten (W), and niobium (Nb).

In the wear-resistant member production method according to the present embodiment, the hard powder is divided into first hard powder HP1 and second hard powder HP2, as illustrated in FIG. 5. Then, a melt pool 21 is formed by melting the first hard powder HP1 and the matrix powder MP using the laser beam 30 while feeding the first hard powder HP1 and the matrix powder MP from the laser processing head 40. While the melt pool 21 is formed, the second hard powder HP2 is fed to the melt pool 21 from a position rearward of a position from which the first hard powder HP1 is fed, in the direction in which the melt pool 21 is moved relative to the unfinished cylinder head 10. That is, in the direction in which the melt pool 21 is moved relative to the unfinished cylinder head 10, the position from which the second hard powder HP2 is fed is located rearward of the position from which the first hard powder HP1 is fed. This allows at least part of the second hard powder HP2 to remain unmelted within the clad layer 20. The second hard powder HP2 is fed, for example, from a nozzle (not illustrated) other than the laser processing head 40.

The first hard powder HP1 and the matrix powder MP need not be fed from the laser processing head 40, and may be fed from another nozzle. The first hard powder HP1 and the matrix powder MP need not be mixed together in advance, and may be fed separately from each other.

As illustrated in FIG. 5, the second hard powder HP2 is introduced into the melt pool 21 without being melted by the laser beam 30. Therefore, it takes a certain amount of time for the second hard powder HP2 to be completely melted. In addition, the second hard powder HP2 is introduced into the melt pool 21 from a position rearward of a position from which the first hard powder HP1 is fed, in the direction in which a site to be heated by the laser beam 30 is moved relative to the unfinished cylinder head 10. Thus, the melt pool 21 solidifies within a short time after the second hard powder HP2 is introduced into the melt pool 21, so that the second hard powder HP2 is likely to remain unmelted. The term "unmelted" is intended to encompass a case where part of the second hard powder HP2 is melted and the rest of the second hard powder HP2 remains unmelted. The second hard powder HP2 may be introduced from a position forward of a position from which the first hard powder HP1 is fed, in the direction in which the site to be heated by the laser beam 30 is moved relative to the unfinished cylinder head 10, as long as the second hard powder HP2 is introduced into a side portion of the melt pool 21, to which the laser beam 30 is not applied.

The matrix powder MP contains, for example, a heat-resistant copper-based alloy containing 10.0 mass % to 38.0 mass % of Ni, 2.0 mass % to 6.0 mass % of silicon (Si), and at least 56.0 mass % of Cu. The matrix powder MP may further contain an element such as Cr, Fe, or Co.

The first hard powder HP1 and the second hard powder HP2 each contain 2.0 mass % to 8.0 mass % of Si, at least 10.0 mass % of one or more elements X selected from Fe, Co, Ni, Cr, and Cu, and at least 15.0 mass % of one or more elements Y selected from Mo, W, and Nb. Si constitutes a hard phase in the form of a silicide expressed by a chemical formula $X_3Y_2Si$.

The first hard powder HP1 and the second hard powder HP2 need not have the same composition, and may have compositions different from each other as long as the contents of the components are within the ranges described above. The second hard powder HP2 may be formed of two or more kinds of hard powder having compositions different from each other. In this case, the two or more kinds of hard powder having compositions different from each other may be mixed in advance and then fed, or may be fed separately from each other.

In the course of cooling of the melt pool 21 formed by melting the first hard powder HP1 and the matrix powder MP, a new hard phase crystallizes out due to a so-called two-liquid phase separation reaction. The crystallized particles also include, as a hard phase, a silicide containing the elements X and the elements Y. In the crystallized particles, the concentrations of the elements Y and Si are higher and the concentrations of the elements X other than Cu are lower than those in the first hard powder HP1. Thus, when the second hard powder HP2 has substantially the same composition as that of the first hard powder HP1, the hardness of the crystallized particles is higher than the hardness of the second hard powder HP2.

The crystallized particles do not become coarse, and have a small particle size of 100 μm or less. This leads to the improved machinability. Further, two kinds of hard particles that differ in hardness and particle size from each other are made present within the clad layer 20, by adjusting the particle size of the second hard powder HP2 to be fed, such that the particle size of the second hard powder HP2 remaining within the clad layer 20 is larger than the particle size of the crystallized particles. This results in a good balance between the machinability and the wear resistance.

The proportion of the hard powder (the total of the first hard powder HP1 and the second hard powder HP2) to the matrix powder MP is preferably within a range of 5.0 mass % to 50 mass %. If the proportion of the hard powder to the matrix powder MP is lower than 5.0 mass %, sufficient wear resistance cannot be obtained. On the other hand, if the proportion of the hard powder to the matrix powder MP is higher than 50 mass %, the hard particles in the clad layer 20 are likely to become so coarse that the machinability deteriorates.

The proportion of the second hard powder HP2 to the first hard powder HP1 is preferably within a range of 25 mass % to 75 mass %. When a higher priority is given to the wear resistance, it is preferable to increase the amount of the second hard powder HP2 within this range. On the other hand, when a higher priority is given to the machinability, it is preferable to increase the amount of the first hard powder HP1 within this range.

The particle size of the second hard powder HP2 is preferably larger from the viewpoint of improvement in the wear resistance, and is preferably smaller from the viewpoint of improvement in the machinability. Specifically, from the viewpoint of improvement in the machinability, the particle size of the second hard powder HP2 is preferably equal to or smaller than 250 μm. This is because the machinability of the clad layer 20 drastically deteriorates if the particle size of the hard particles in the clad layer 20 exceeds 250 μm. The particle size of each of the first hard powder HP1 and the matrix powder MP is not limited to any particular size. From the viewpoint of ease of melting, the particle size of each of the first hard powder HP1 and the matrix powder MP is preferably as small as possible, specifically, is preferably equal to or smaller than 150 μm.

In the wear-resistant member production method according to the present embodiment, the hard powder is divided into the first hard powder HP1 and the second hard powder HP2, and the first hard powder HP1 and the matrix powder MP are melted by a local heating device. That is, this method can reduce the amount of the hard powder to be melted by a local heating device, as compared to conventional methods. It is thus possible to suppress the hard particles in the clad layer from becoming coarse due to aggregation of the hard powder particles. As a result, deterioration of the machinability of the clad layer is reduced. In addition, sufficient wear resistance is ensured by allowing at least part of the second hard powder HP2 to remain unmelted within the clad layer 20.

Hereinafter, Example and Comparative Example will be described. However, the disclosure is not limited to Example described below. Table 1 indicates the composition of each of matrix powder and hard powder used in Example and Comparative Example. Table 2 indicates the Vickers hardness (HV0.1), the liquidus temperature, and the solidus temperature of each of the matrix powder and the hard powder used in Example and Comparative Example.

In Example, the hard powder was divided into first hard powder and second hard powder. The composition of each of the first hard powder and the second hard powder was identical to the composition of the hard powder indicated in Table 1. As illustrated in FIG. 5, the first hard powder and the matrix powder each having a sieve particle size of 32 μm to 106 μm were mixed together and melted by a laser beam to form a melt pool. While the melt pool was formed, the second hard powder having a sieve particle size of 106 μm to 150 μm was fed to the melt pool from a position rearward of a position from which the first hard powder is fed, in the direction in which a site to be heated by the laser beam is moved relative to an unfinished cylinder head.

In Example, the mass ratio among the matrix powder, the first hard powder, and the second hard powder was 75:15:10. That is, the proportion of the hard powder (the total of the first hard powder and the second hard powder) to the matrix powder was 33.3 mass %, and the proportion of the second hard powder to the first hard powder was 66.7 mass %.

In Comparative Example, the hard powder and the matrix powder each having a sieve particle size of 32 μm to 106 μm were mixed together without dividing the hard powder into first hard powder and second hard powder, and the mixture was melted by a laser beam to form a clad layer. The mass ratio between the matrix powder and the hard powder was 75:25. That is, the proportion of the hard powder to the matrix powder was 33.3 mass %, as in Example.

TABLE 1

| | Composition (mass %) | | | | | | | |
|---|---|---|---|---|---|---|---|---|
| | Cu | Ni | Si | Mo | Fe | Co | Cr | C | O |
| Matrix powder | bal. | 12.3 | 2.61 | <0.01 | 3.82 | 2.61 | 0.99 | — | 0.01 |
| Hard powder | 0.5 | 22.8 | 5.17 | 39.4 | 12.4 | 15.6 | 4.11 | <0.01 | 0.02 |

TABLE 2

| | Hardness (HV0.1) | Liquidus temperature (° C.) | Solidus temperature (° C.) |
|---|---|---|---|
| Matrix powder | 192 | 1120 | 1040 |
| Hard powder | 861 | 1485 | 1275 |

In each of Example and Comparative Example, a plate containing an A5052 aluminum alloy specified in JIS was used as a substrate, and a semiconductor laser device was used to form a clad layer. As for the cladding conditions, the output power was 2.0 kW, the cladding rate was 20.0 mm/sec, and the feed rate of the cladding powder was 0.03 g/mm.

Figure 6:
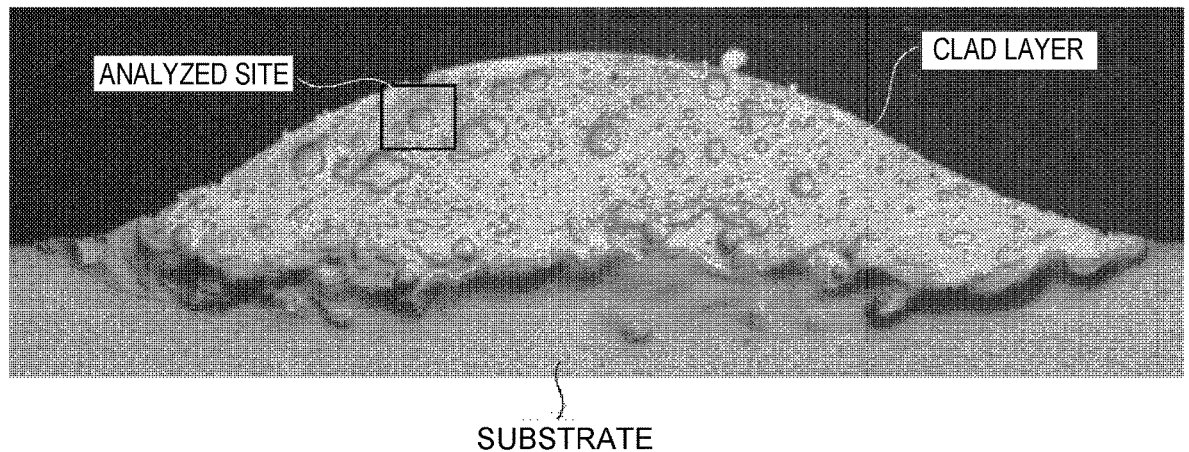
FIG. 6 is an optical photomicrograph of a section of a clad layer according to Example.
Figure 7:
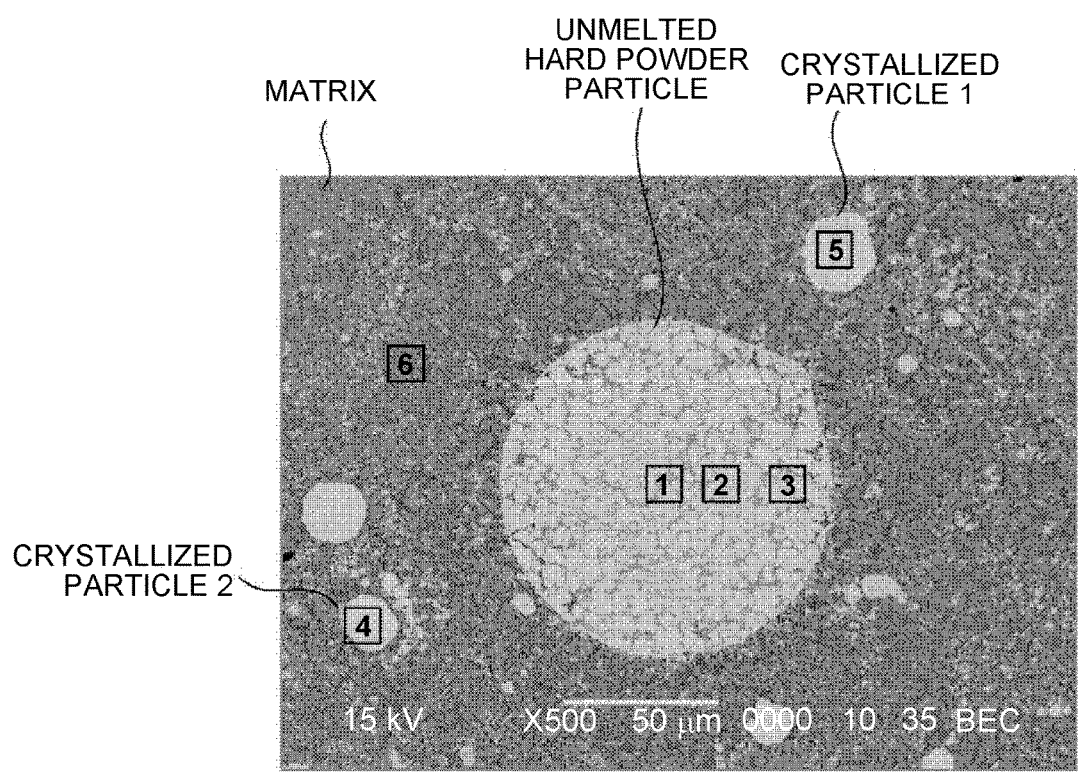
FIG. 7 is a reflected electron image of an analyzed site indicated in FIG. 6.

FIG. 6 is an optical photomicrograph of a section of a clad layer according to Example. FIG. 7 is a reflected electron image of an analyzed site indicated in FIG. 6. Table 3 indicates the results of element analysis performed on analyzed spots 1 to 6 indicated in FIG. 7. As seen from FIG. 6 and FIG. 7, the clad layer according to Example had a texture having a matrix in which unmelted hard powder and crystallized particles were dispersed. The unmelted hard powder was composed of the second hard powder having a sieve particle size of 106 to 150 μm and remaining unmelted. The crystallized particles had a particle size of several tens of micrometers or less. That is, the hard particles in the clad layer were suppressed from becoming coarse.

As seen from FIG. 7, Cu of the matrix underwent a diffusion reaction to enter the unmelted hard powder composed of the second hard powder having a sieve particle size of 106 to 150 μm and remaining unmelted. As indicated in the columns for the analyzed spots 1 to 3 in Table 3, the Cu concentration in the unmelted hard powder was higher than that in the material hard powder indicated in Table 1. On the other hand, the concentrations of the other main alloy elements such as Mo, Ni, Co, and Si in the unmelted hard powder were similar to those in the material hard powder indicated in Table 1. The Vickers hardness of the unmelted hard powder illustrated in FIG. 7 was 882 HV0.1, which was similar to the Vickers hardness of the material hard powder indicated in Table 1. As described above, the unmelted hard powder can be identified by the visual appearance, composition, and hardness.

As seen from FIG. 7, the particle size of the crystallized particles was several tens of micrometers or less and was smaller than that of the unmelted hard powder. As indicated in the columns for the analyzed spots 4 and 5 in Table 3, the Mo concentration was higher and the Ni and Co concentrations were lower in the crystallized particles 1 and the crystallized particles 2 than in the material hard powder indicated in Table 1. Thus, the Vickers hardness of the crystallized particles 1 and the crystallized particles 2 became significantly higher that of the material hard powder indicated in Table 1, and values of the Vickers hardness of the crystallized particles 1 and the crystallized particles 2 were 1252 HV0.1 and 1195 HV0.1, respectively. As described above, the crystallized particles can be identified by the visual appearance, composition, and hardness.

TABLE 3

| | Analyzed spot | Result of element analysis (mass %) | | | | | | | | |
|---|---|---|---|---|---|---|---|---|---|---|
| | | C | Al | Si | Cr | Fe | Co | Ni | Cu | Mo |
| Unmelted hard powder | 1 | 1.0 | 0.2 | 5.2 | 4.9 | 4.9 | 16.2 | 20.2 | 3.3 | 37.6 |
| | 2 | 0.4 | 0.2 | 5.1 | 4.0 | 4.0 | 15.9 | 22.5 | 2.5 | 38.0 |
| | 3 | 1.2 | 0.6 | 4.9 | 4.7 | 4.7 | 14.2 | 20.2 | 4.4 | 38.6 |
| Crystallized particles 1 | 4 | 0.0 | 3.0 | 6.0 | 2.9 | 2.9 | 9.4 | 10.6 | 9.4 | 48.3 |
| Crystallized particles 2 | 5 | 0.0 | 2.8 | 5.6 | 3.5 | 3.5 | 10.8 | 11.7 | 8.6 | 45.6 |
| Matrix | 6 | 3.1 | 7.4 | 2.1 | 0.9 | 0.9 | 3.9 | 15.0 | 63.0 | 0.5 |

The clad layers according to Example and Comparative Example were subjected to a machinability test during plunging. In the machinability test, a TiCN-coated carbide tip was used as a cutting bit. 300 clad layers were processed under the following plunging conditions that the cutting velocity V was 80 m/min, the feed rate per revolution f was 0.03 mm/rev, and the depth of cut t was 0.5 mm.

Figure 8:
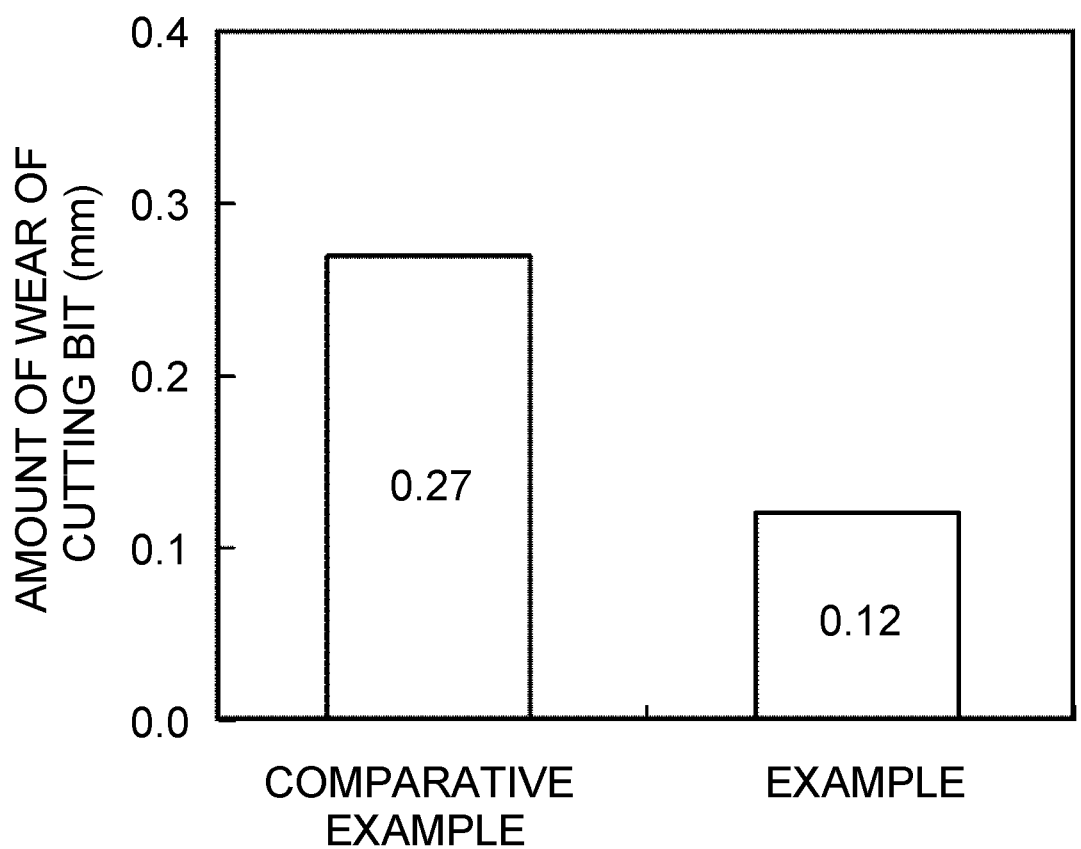
FIG. 8 is a bar graph illustrating comparison between the results of a machinability test performed on the clad layer according to Example and a clad layer according to Comparative Example.

FIG. 8 is a bar graph illustrating comparison between the results of a machinability test performed on the clad layer according to Example and the clad layer according to Comparative Example. The ordinate axis represents the amount of wear of the cutting bit. As illustrated in FIG. 8, the amount of wear of the cutting bit used to cut the clad layer according to Example was half or less the amount of wear of the cutting bit used to cut the clad layer according to Comparative Example. This means that the clad layer according to Example exhibited improved machinability.

In addition, valve seats produced by cutting the clad layers according to Example and Comparative Example were subjected to a wear test simulating the use as exhaust valve seats. The conditions for the wear test were as follows: the spring load was 25 kgf, the rotational speed of the valve was 30 rpm, the amount of lift of the valve was 4.9 mm, the rotational speed of the cam was 2300 rpm, the temperature of the bottom surface of the valve seat was 300° C., the air-fuel ratio was 30, and the test time was eight hours.

Figure 9:
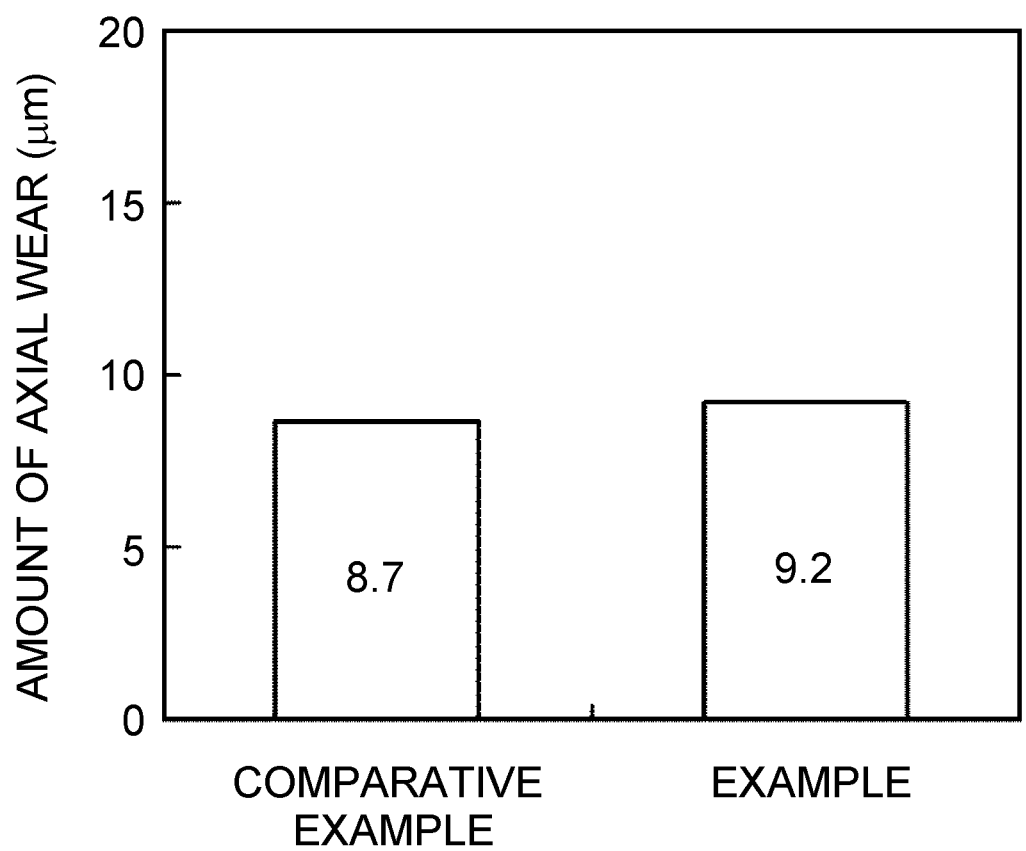
FIG. 9 is a bar graph illustrating comparison between the results of a wear test performed on a valve seat according to Example and a valve seat according to Comparative Example.

FIG. 9 is a bar graph illustrating comparison between the results of a wear test performed on the valve seat according to Example and the valve seat according to Comparative Example. The ordinate axis represents the amount of wear of the valve seat in the axial direction thereof. As illustrated in FIG. 9, the amount of wear of the valve seat in its axial direction according to Example was substantially the same as the amount of wear of the valve seat in its axial direction according to Comparative Example. As described above, the wear resistance in Example was at substantially the same level as that in Comparable Example, and the machinability of the clad layer in Example was considerably higher than that in Comparative Example.

The disclosure is not limited to the foregoing embodiment and the foregoing embodiment may be modified as appropriate without departing from the scope of the disclosure. For example, the cladding method used may be other than laser cladding employed in the foregoing embodiment and may be gas cladding or plasma cladding.

What is claimed is:

1. A wear-resistant member comprising:
   a substrate; and
   a clad layer provided on the substrate, the clad layer including a matrix, hard powder, and crystallized particles, the matrix containing a copper-based alloy, the hard powder including, as a hard phase, a silicide containing one or more elements selected from Cr, Fe, Co, Ni, and Cu, and one or more elements selected from Mo, W, and Nb, and the crystallized particles including, as a hard phase, a silicide containing one or more elements selected from Cr, Fe, Co, Ni, and Cu, and one or more elements selected from Mo, W, and Nb, and
   wherein the hard powder has a larger particle size than a particle size of the crystallized particles and wherein the crystallized particles have a higher Mo concentration and lower Ni and Co concentrations than the hard powder.

2. The wear-resistant member according to claim 1, wherein the hard powder has a particle size of 250 μm or less.

3. The wear-resistant member according to claim 1, wherein the crystallized particles have a particle size of 100 μm or less.

4. The wear-resistant member according to claim 1, wherein the crystallized particles have a higher hardness than a hardness of the hard powder.

5. A method for producing the wear-resistant member according to claim 1, the method comprising:
   forming a clad layer on a substrate by moving, relative to the substrate, a site to be heated by a local heating device, while feeding cladding powder onto the substrate and melting the cladding powder using the local heating device, the cladding powder including matrix powder and hard powder, the matrix powder containing a copper-based alloy, and the hard powder including a silicide as a hard phase, the silicide containing one or more elements selected from Cr, Fe, Co, Ni, and Cu, and one or more elements selected from Mo, W, and Nb; and
   cutting the clad layer formed on the substrate, wherein
   the hard powder includes first hard powder and second hard powder, and
   in a course of formation of the clad layer, the second hard powder is fed, separately from the first hard powder, to a melt pool formed by melting the first hard powder and the matrix powder using the local heating device, such that at least part of the second hard powder remains unmelted within the clad layer.

6. The method wherein the second hard powder has a larger particle size than a particle size of the first hard powder.

7. The method wherein the second hard powder has a particle size of 250 μm or less.

8. The method according to claim 5, wherein the second hard powder is fed to the melt pool from a position rearward of a position from which the first hard powder is fed, in a direction in which the site to be heated is moved relative to the substrate.

9. The method according to claim 5, wherein each of both the first hard powder and the second hard powder contains at least 10 mass % of the one or more elements selected from Cr, Fe, Co, Ni, and Cu, at least 15 mass % of the one or more elements selected from Mo, W, and Nb, and 2.0 mass % to 8.0 mass % of Si.

* * * * *